United States Patent [19]

Johnson

[11] Patent Number: 4,932,517
[45] Date of Patent: Jun. 12, 1990

[54] GUIDE RAIL SYSTEM

[75] Inventor: Thomas G. Johnson, Sutton, Mass.

[73] Assignee: POBCO Inc., Worcester, Mass.

[21] Appl. No.: 325,307

[22] Filed: Mar. 17, 1989

[51] Int. Cl.$^5$ ............................................. B65G 21/20
[52] U.S. Cl. ............................... 198/836.1; 198/836.3
[58] Field of Search ..................... 198/836, 860.3, 778, 198/957, 841

[56] References Cited

U.S. PATENT DOCUMENTS

| | | | |
|---|---|---|---|
| 3,666,082 | 5/1972 | Riggs | 198/836 X |
| 3,669,244 | 6/1972 | Pagdin . | |
| 3,788,457 | 1/1974 | Valentino, Jr. | 198/836 |
| 3,854,688 | 12/1974 | Shuford | 198/836 X |
| 4,502,594 | 5/1985 | Sijbrandij | 198/836 |
| 4,511,031 | 4/1985 | Lachonius | 198/836 |
| 4,738,352 | 4/1988 | Norbut | 198/836 X |
| 4,760,775 | 8/1988 | Hoskins | 99/353 |

OTHER PUBLICATIONS

Valu Guide Conveyor Components Brochure, Sep. 1977, Technical Folio No. 115.

Primary Examiner—Robert J. Spar
Assistant Examiner—Lyle Kimms
Attorney, Agent, or Firm—Norman S. Blodgett; Gerry A. Blodgett

[57] ABSTRACT

System for guiding articles along a path, consisting of a rail with a metal core and a sheath of polymer material surrounding it, the sheath being formed to provide a generally cylindrical surface facing toward the path and to provide an opposite surface adapted to be used in clamping the rail in a selected position.

3 Claims, 1 Drawing Sheet

U.S. Patent
Jun. 12, 1990
4,932,517
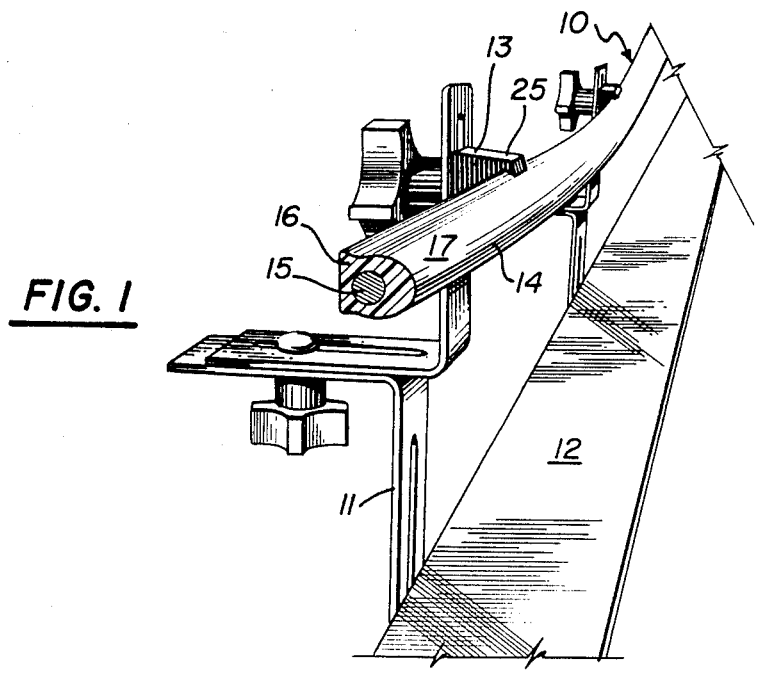
FIG. 1
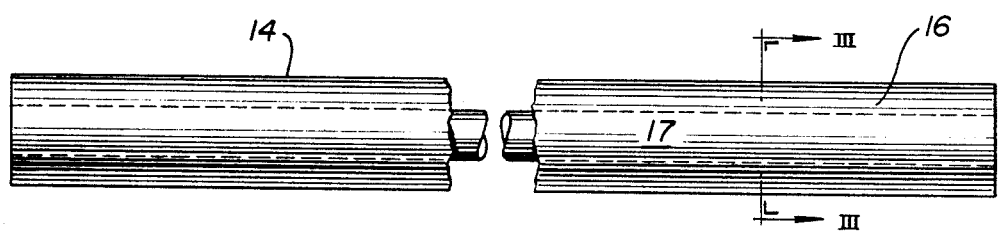
FIG. 2
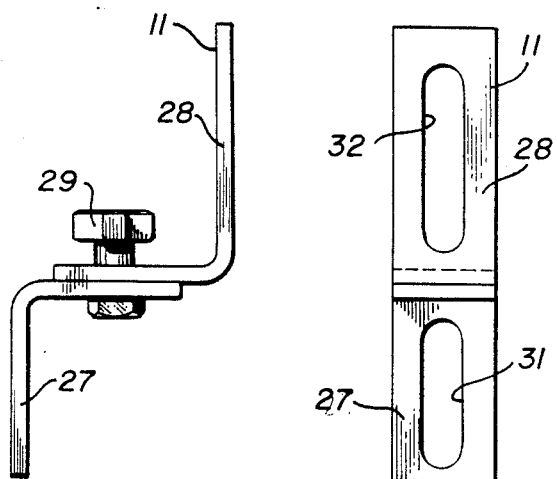
FIG. 4
FIG. 5
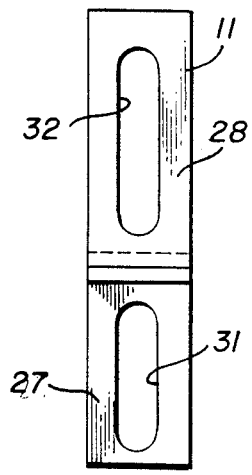
FIG. 3
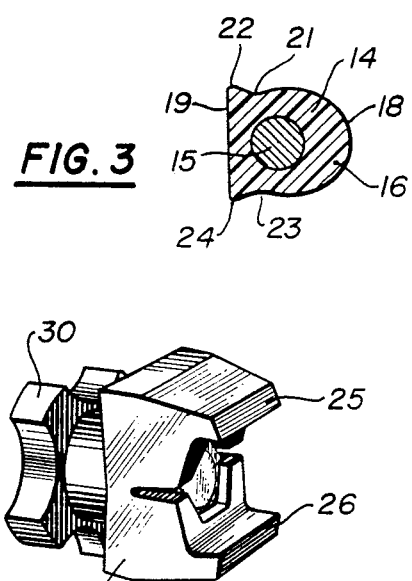
FIG. 6

GUIDE RAIL SYSTEM

BACKGROUND OF THE INVENTION

There are many instances in the design and construction of conveying equipment and the like in which it is desirable to provide a rail system not only to guide articles being carried on a conveyor but also to prevent the articles from contacting other parts of the machinery. Such contact and rubbing could cause wear or damage both to the articles and to the parts of the machinery. This is particularly true in the food industry in which food elements are being moved along a path defined by a conveyor, but in which it is also desirable to protect against wear and at the same time to be completely sanitary. Such a system must not, of course, be capable of permitting the accumulation of food particles or bacteria. At the same time, the equipment must be capable of being cleaned with strong chemical detergents and antiseptic materials. While such systems have been developed in the past, they have lacked some necessary elements, thus rendering them less than optimum in performance. Many of the systems are very complicated and expensive. Most of them are not capable of being adapted to curved paths without the bending being accomplished on heavy machinery; this means that they were not capable of being adapted to the curved path at the installation site. These and other difficulties experienced with the prior art devices have been obviated in a novel manner by the present invention.

It is, therefore, an outstanding object of the invention to provide a guide rail system which can be readily adapted to fit a curved path at the installation site.

Another object of this invention is the provision of a guide rail which can be formed manually and without the use of heavy machinery.

A further object of the present invention is the provision of a guide rail system in which the important elements are readily replaceable in case of damage or deterioration.

It is another object of the instant invention to provide a guide rail system in which the elements are formed with materials and have surfaces which are readily maintained in a sanitary condition.

A still further object of the invention is the provision of a guide rail which can be cleaned with strong chemicals without deterioration.

It is a further object of the invention to provide a guide rail system which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the present invention consists of a guide rail system having a bracket which is adapted to be attached adjacent a path, having a clip attached to the bracket, and having a rail supported on the clip. The rail consists of a metal core around which is formed a sheath of polymer material, the sheath having a generally cylindrical surface facing the said path.

More specifically, the rail has a cross-sectional shape consisting of a closed figure having a semi-circular portion and a straight line portion directly opposite the semi-circular portion, each end of the semi-circular portion being connected to an end of the straight line portion by a long concave curved portion and a short convex curved portion.

BRIEF DESCRIPTION OF THE DRAWINGS

The character of the invention, however, may be best understood by reference to one of the structural forms, as illustrated by the accompanying drawings, in which:

FIG. 1 is a perspective view of a guide rail system incorporating the principles of the present invention, FIG. 2 is a front elevational view of a guide rail which is an important element of the system, FIG. 3 is a vertical sectional view of the guide rail taken on the line III—III of FIG. 2, FIG. 4 is a side elevational view of a bracket used in the system, FIG. 5 is a front elevational view of the bracket, and FIG. 6 is a perspective view of a clip used in the system.

DESCRIPTION OF THE PREFERRED EMBODIMENT

Referring first to FIG. 1, wherein are best shown in the general features of the invention, it can be seen that the guide rail system, indicated generally by the reference numeral 10, is provided with a bracket 11 which is adapted to be mounted adjacent a path 12. The path 12 in general is intended to designate the upper horizontal surface of a conveyor, which conveyor may be of the belt type, link type, or similar construction. A clip 13 is attached to the bracket 11 and holds a rail 14. The rail consists of a metal core 15 around which is formed a sheath 16 made of a polymer material, the sheath having a generally cylindrical surface 17 which faces in the general direction of the path.

Referring to FIGS. 2 and 3, it can be seen that the guide rail 14 is substantially elongated and has a cross-sectional shape indicated in FIG. 3 as being a closed geometric figure. This figure has a semi-circular portion 18 (which defines the surface 17 mentioned above) and located directly opposite the semi-circular portion 18 is a straight line portion 19, these two portions lying on opposite sides of the core 15. The upper end of the semi-circular portion 18 is connected to the upper end of the straight line portion 19 by a long concave curved portion 21 and, a short convex curved portion 22. Similarly, the bottom end of the semi-circular portion 18 is connected to the bottom end of the straight line portion 19 by a long concave curved portion 23 and a short convex curved portion 24. In the preferred embodiment, the core 15 of the rail 14 is formed of stainless steel while the sheath 16 is formed of high-density polyethylene.

In FIGS. 4 and 5, it can be seen that the bracket 11 consists of a lower L-shaped element 27 and an upper L-shaped element 28. The two elements are held together by a clamping knob 29. The lower element 27 is provided with a slot 31 which permits it to be attached to a base element adjacent the path 12, while the upper element 28 is provided with a slot 32 which permits the clip 13 to be attached to it.

FIG. 6 shows that the clip 13 is a unitary plastic molded element having upper and lower hooks 25 and 26 which are adapted to embrace the rail 14. More specifically, the hook 25 rests on the convex curve portion 22 and extends downwardly into the concaved portion 21 while the hook 26 rests on the convex curved portion 24 and extends into the concave curve portion 23.

The operation and advantages of the present invention will now be readily understood in view of the above description. In mounting the system adjacent the path 12, a series of the brackets 11 is fastened to base elements of the machinery defining the path and a clip 13 is provided on each of the brackets with the hooks 25 and 26 extending toward the path 12. The rail 14 is then snapped into the clips. If the path is curved at any portion, it is only necessary to manually bend the rail. This is due to the fact that the core 15 is stainless steel which is a malleable metal element in addition to being strong and free of corrosion. Once the rail has been bent, it does not spring back. Furthermore, the feature of the cross-sectional shape, including the straight line portion 19, allows the rail to be readily manually bent into a long curve in which the straight line portions remain vertical and parallel to the axis of curvature. In that bent condition, it is possible to readily snap the rail into a series of clips 13. In that condition, the cylindrical surface 17 facing toward the path 12 provides a rigid guide surface which not only will not scratch articles moving along the path, but also will not itself be substantially worn by contact with such articles. In addition, the rail 14 can be readily cleaned even with very strong chemical cleaners. It can be seen that the system contains no crevices for bacteria buildup and nevertheless is strong and durable. No machine is needed when installing radius corners and bends. From its very nature, the elements of the system are inexpensive and are readily replaced in case individual parts are damaged.

It is obvious that that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. In a guide rail system of the type for mounting a guide rail to support brackets spaced along a conveyor path and having clips for attaching the guide rail to the support brackets, the improvement comprising:

a rail consisting of a metal core around which is formed a sheath of polymer material, the sheath having a generally cylindrical surface facing in the general direction of the said path, wherein the rail has a cross-sectional shape consisting of a closed figure having a semi-circular portion and having a straight line portion directly opposite and spaced from the semi-circular portion, each end of the semi-circular portion being connected to an end of the straight line portion by a long concave curve portion and a short convex curve portion, whereby the clip is adopted to engage the convex curve portions and extend into the concave curve portions.

2. Guide rail system as recited in claim 1, wherein the clip is provided with opposed hook elements.

3. Guide rail system as recited in claim 1, wherein the core is formed of stainless steel of circular cross-section and the sheath is formed of high-density polyethylene.

* * * * *